Figure 2A:
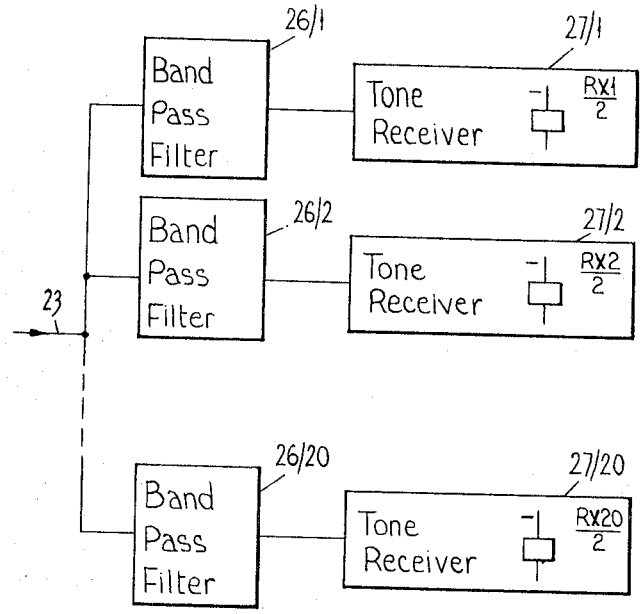

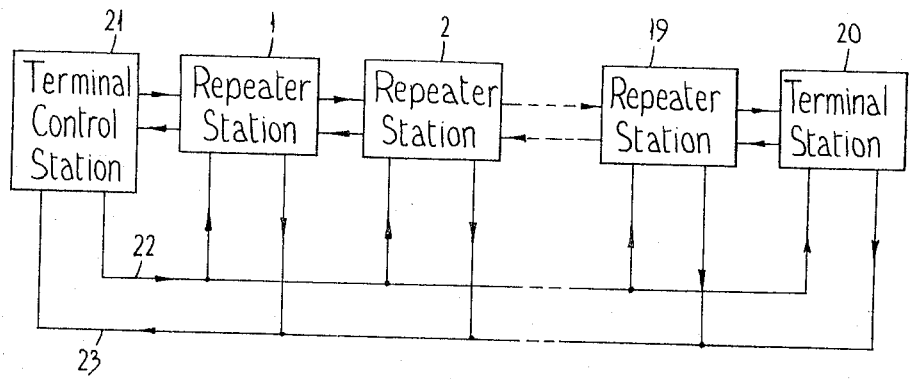

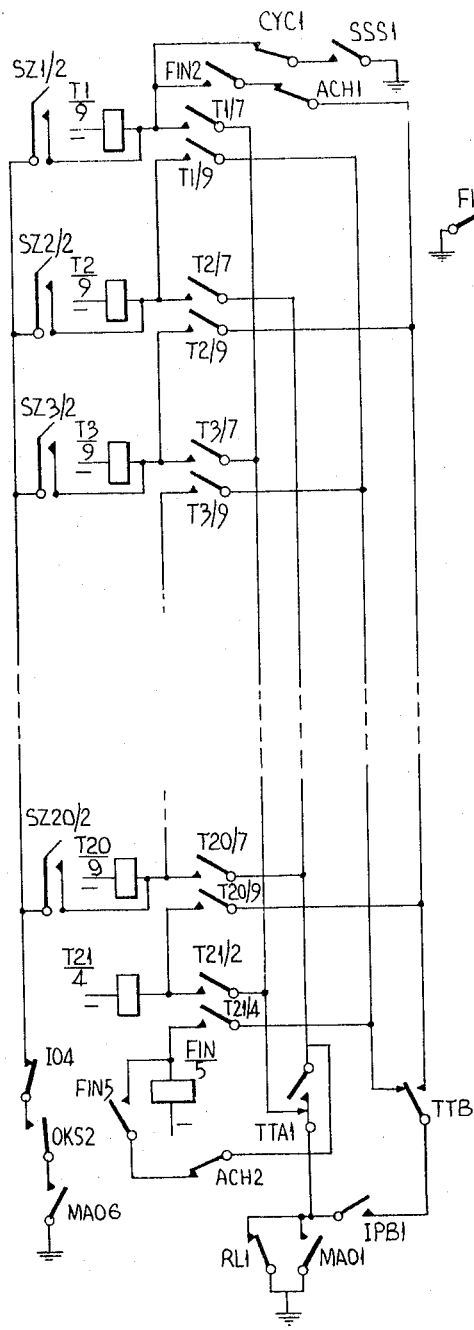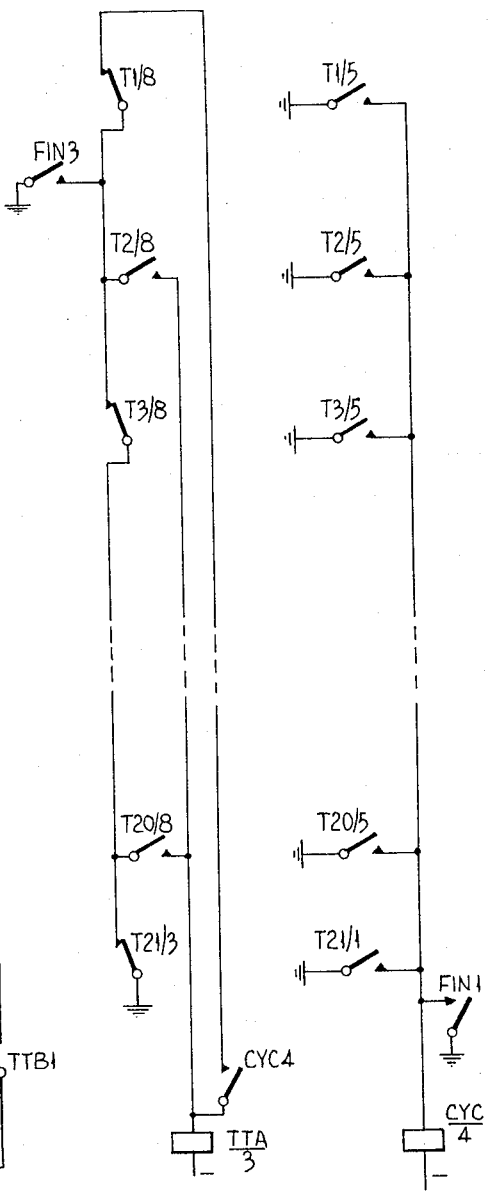
Fig.4  Fig.4A  Fig.4B

Jan. 31, 1967        D. L. CLAY        3,302,113
REMOTE MONITORING AND CONTROL SYSTEM WITH ALL CONTROL AND
MONITORING TONES GENERATED AT CONTROL STATION
Filed Oct. 22, 1963        12 Sheets-Sheet 7

INVENTOR
DAVID LANGSFORD CLAY
BY
Kinchstein, Kinchstein & Ottyer
ATTORNEYS

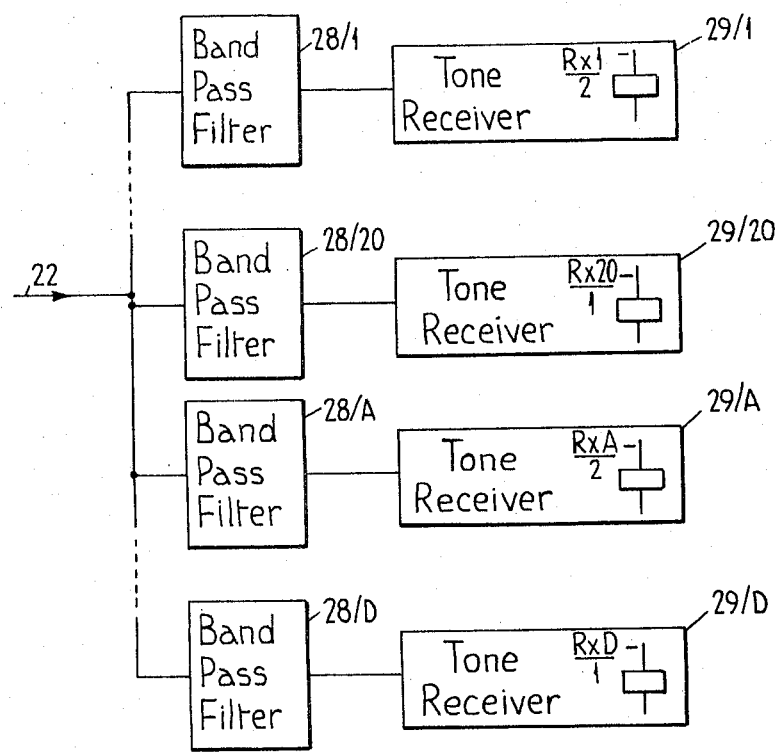
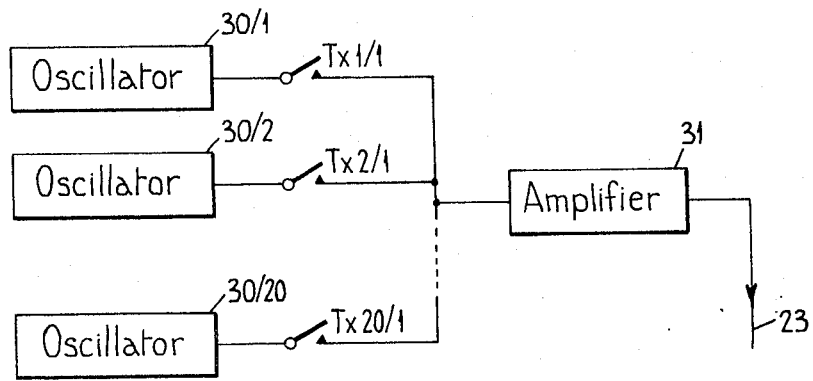
Fig. 11A
Fig. 11

United States Patent Office 3,302,113
Patented Jan. 31, 1967

3,302,113
REMOTE MONITORING AND CONTROL SYSTEM WITH ALL CONTROL AND MONITORING TONES GENERATED AT CONTROL STATION
David Langsford Clay, Coventry, England, assignor to The General Electric Company Limited, Coventry, England
Filed Oct. 22, 1963, Ser. No. 317,896
Claims priority, application Great Britain, Oct. 25, 1962, 40,412/62; Dec. 20, 1962, 48,122/62
7 Claims. (Cl. 325—2)

This invention relates to supervisory arrangements.

More particularly, but not exclusively, the invention relates to supervisory arrangements which form part of a multi-station radio relay communication system.

Such a system may include a terminal or control station and a large number of remote repeater stations, and it may be desired that indications should be made available at the control station to show the condition of various variables at the remote stations. For example, an indication may be required to show whether the remote station is operating on its main equipment or on its stand-by equipment. Such indications may be required to be given on interrogation by the control station, and/or automatically if there is a change in any one of the variables at any one of the remote stations.

In addition, it may be desired to effect control of variables at the remote stations from the control station.

A previously proposed supervisory arrangement which is capable of performing at least some of these functions, includes multi-position electro-mechanical stepping switches at the control station and at each of the remote stations. To obtain an indication or effect a control in respect of a particular variable at a particular remote station, that remote station is first seized by the transmission of a predetermined signal from the control station. The switch at the control station is then brought to the position corresponding to the particular variable, signals being at the same time transmitted to the remote station to cause the switch at the remote staton to be stepped, in synchronism with the switch at the control station, to the corresponding position. In this way a path is established from the control station to the equipment associated with the desired variable, and the indication can then be obtained or the control effected.

One of the difficulties of this previously proposed arrangement is that the switches must be set up and maintained in very accurate adjustment, to ensure that they are always stepped in exact synchronism and the desired variable is always selected.

One object of the present invention is to provide a supervisory arrangement in which this difficulty is, at least in part, avoided.

According to one aspect of the present invention, a supervisory arrangement for use with a system which includes a control station and a plurality of other stations at each of which are situated variables in respect of the condition of which indications are required at the control station, comprises a two-way transmission path which links all the stations of the system, and means at each station to transmit and receive signals over said path whereby said indications are made available at the control station, the arrangement being such that the same signals are used both to identify said other stations and to identify said variables.

Preferably each of said other stations includes means to generate one of said signals in respect of each of the variables at that station, and means which operates, when all the variables in that station have a predetermined condition, to transmit one only of said signals generated.

Preferably the same signals are also used to effect control of said variables from the control station.

According to a feature of the present invention, a supervisory arrangement for use with a system which includes a control station and a plurality of other stations at each of which are situated variables in respect of the condition of which indications are required at the control station, comprises a two-way transmission path which links all the stations of the system, first means at each of said other stations arranged to produce a signal characteristic of each of said variables so long as that variable has a predetermined condition, a different signal being produced for each of the variables at any one of said other stations but the same signal being produced for similar variables at different ones of said other stations, second means at each of said other stations arranged to transmit one only of the signals produced at that station as a station identifying signal as long as the variables at that station are as previously signalled to the control station, a different identifying signal being transmitted by each of said other stations, third means at each of said other stations which operates on reception of a first command signal transmitted by the control station to inhibit transmission of the identifying signal, fourth means at each of said other stations which is arranged, upon reception of the identifying signal for that other station, to prepare an operating circuit for fifth means, said fifth means being arranged to transmit all the signals characteristic of the variables at that other station which have said predetermined condition, this means being operable only when the third means at that station is operated and when a second command signal is received by that station, first means at the control station to receive the identifying signals transmitted by said other stations and to recognise if any one or more of these identifying signals is not being received, second means at the control station to transmit the first and second command signals and any of the identifying signals for the purpose of operating the third, fourth or fifth means at any of said other stations, and third means at the control station to provide an indication in respect of the condition of any of said variables in response to signals transmitted by the fifth means at any of said other stations.

According to a further feature of the present invention, a supervisory arrangement for use with a system which includes a control station and a plurality of other stations at each of which are situated variables in respect of the condition of which indications are required at the control station, comprises a two-way transmission path which links all the stations of the system, first means at each of said other stations arranged, as long as the variables at that station are as previously signalled to the control station, to transmit an identifying signal, a different identifying signal being transmitted by each of said other stations, second means at each of said other stations which operates on reception of a first command signal transmitted by the control station to inhibit transmission of the identifying signal, third means at each of said other stations which is arranged, upon reception of the identifying signal for that other station, to prepare an operating circuit for fourth means, said fourth means being arranged to retransmit signals characteristic of the variables at that station which have predetermined conditions, the fourth means operating only when the second means at that station is operated and a second command signal and signals characteristic of all the variables in that station are received by that station, first means at the control station to receive all the identifying signals transmitted by said other stations and to recognise if any one or more of these identifying signals is not being received, second means at the control station to transmit the first and second command signals and any of the identifying signals for the purpose of operating the second, third or fourth means at any of said other stations, and third means at the control station to provide an indication in respect of the condition of any of said variables in response to signals retransmitted by the fourth means at any of said other stations.

The separate apparatus for use at the control station and at the other stations of the supervisory arrangement as set out in the two preceding paragraphs constitute other aspects of the invention.

Preferably said arrangement also includes means to enable the control station to effect a control in respect of variables at any one of said other stations, this means also making use of said signals.

Each of said signals may be continuous tone, each of these tones having a different frequency and these frequencies being spaced throughout a band of frequencies allocated to the supervisory arrangement.

Figure 2:
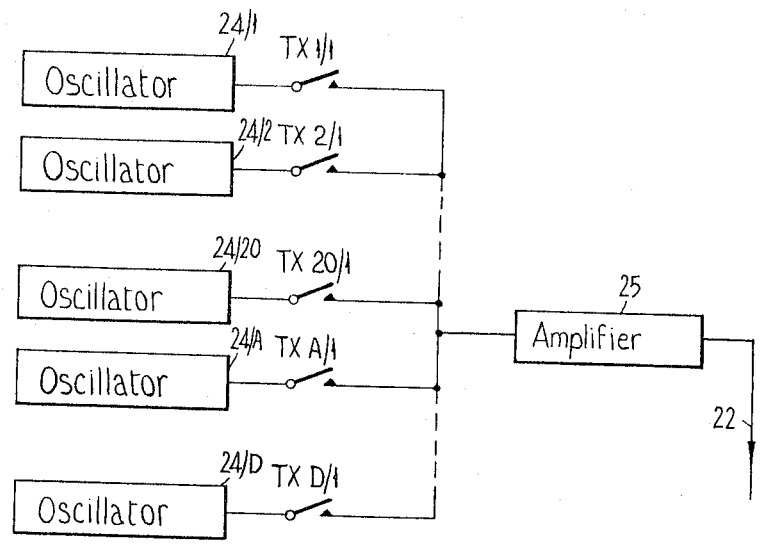
Figure 3:
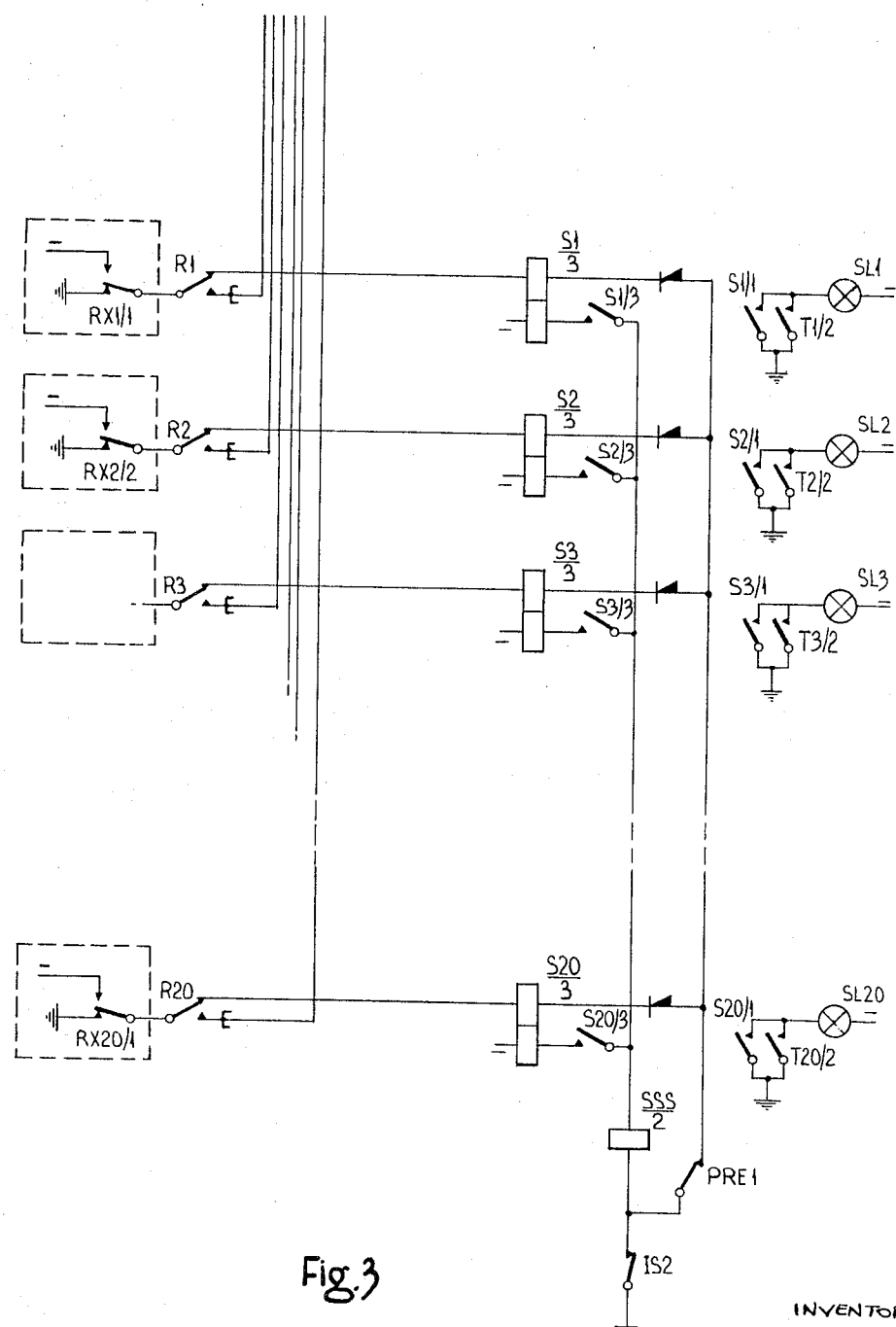
Figure 5:
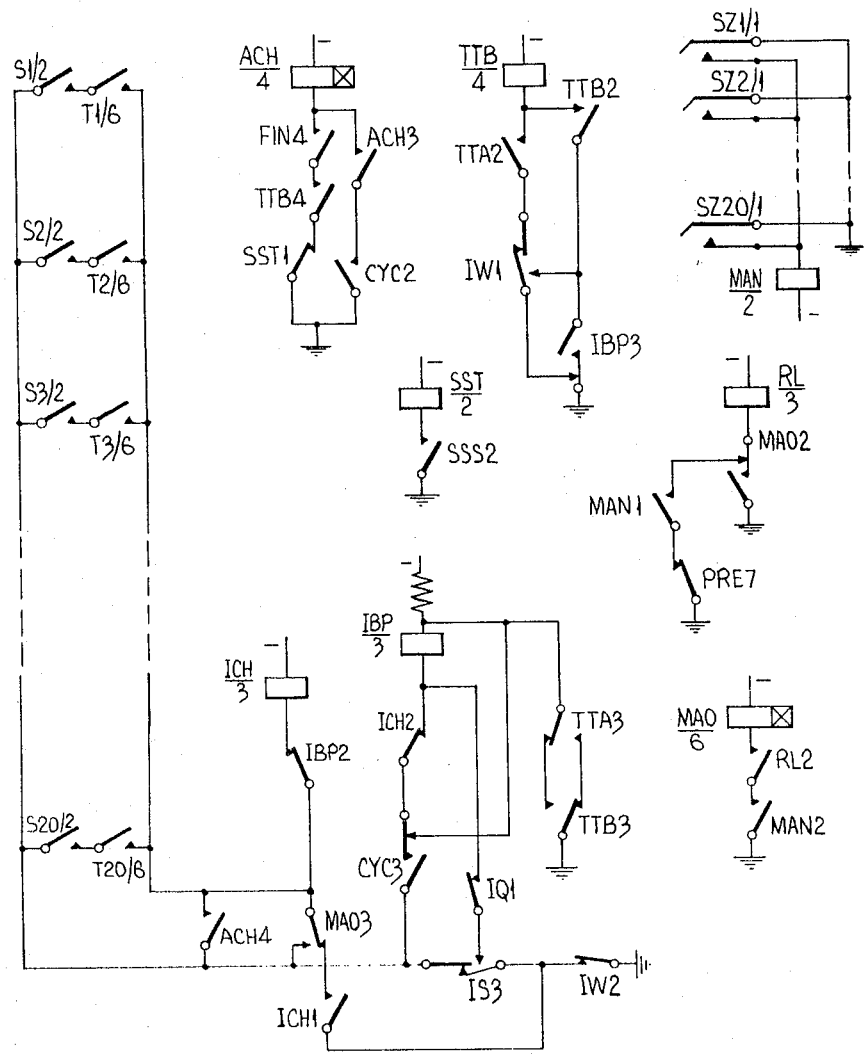
Figure 6:
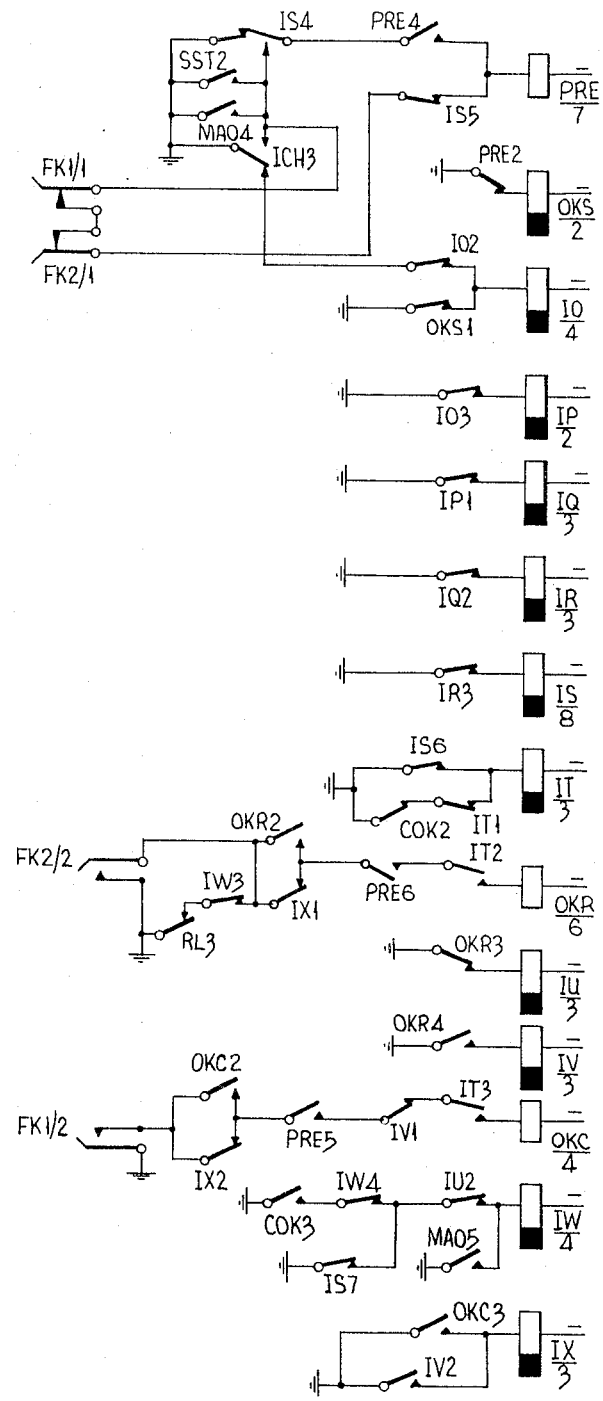
Figure 7A:
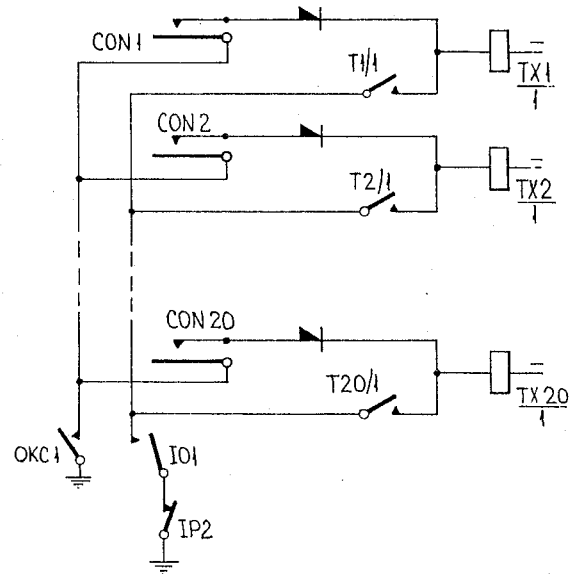
Figure 7:
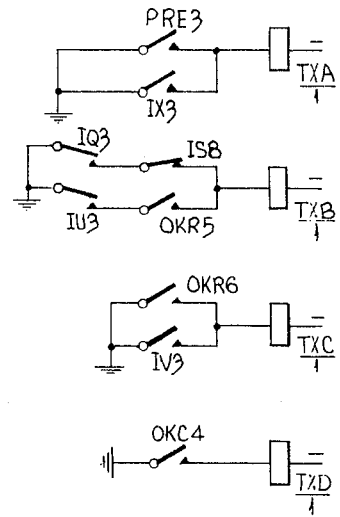

A supervisory arrangement in accordance with the present invention and forming part of a multi-station radio relay communication system will now be described by way of example with reference to the accompanying drawings, of which:

FIGURE 1 shows schematically the communication system and the supervisory arrangement, FIGURES 2A, 3, 4, 4A, 4B, 5, 6, 7, 7A and 9, when arranged as shown in FIGURE 10, show diagrammatically that part of the supervisory arrangement at the control or terminal station of FIGURE 1, FIGURE 10 shows the relationship between FIGURES 2 to 9, supplementary FIGURES 2A, 4A, 4B and 7A being considered part, respectively, of their affiliated principal FIGURES 2, 4 and 7

Figure 12:
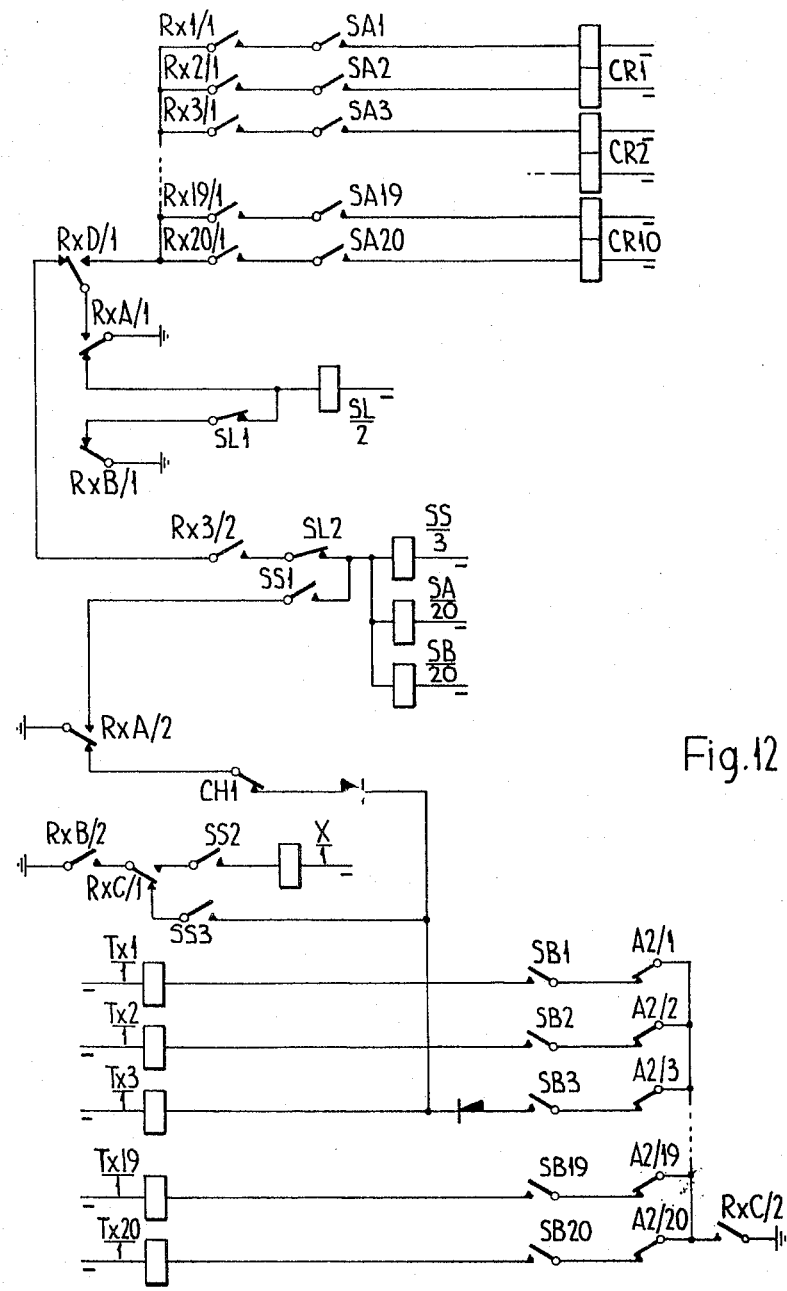
Figure 13:
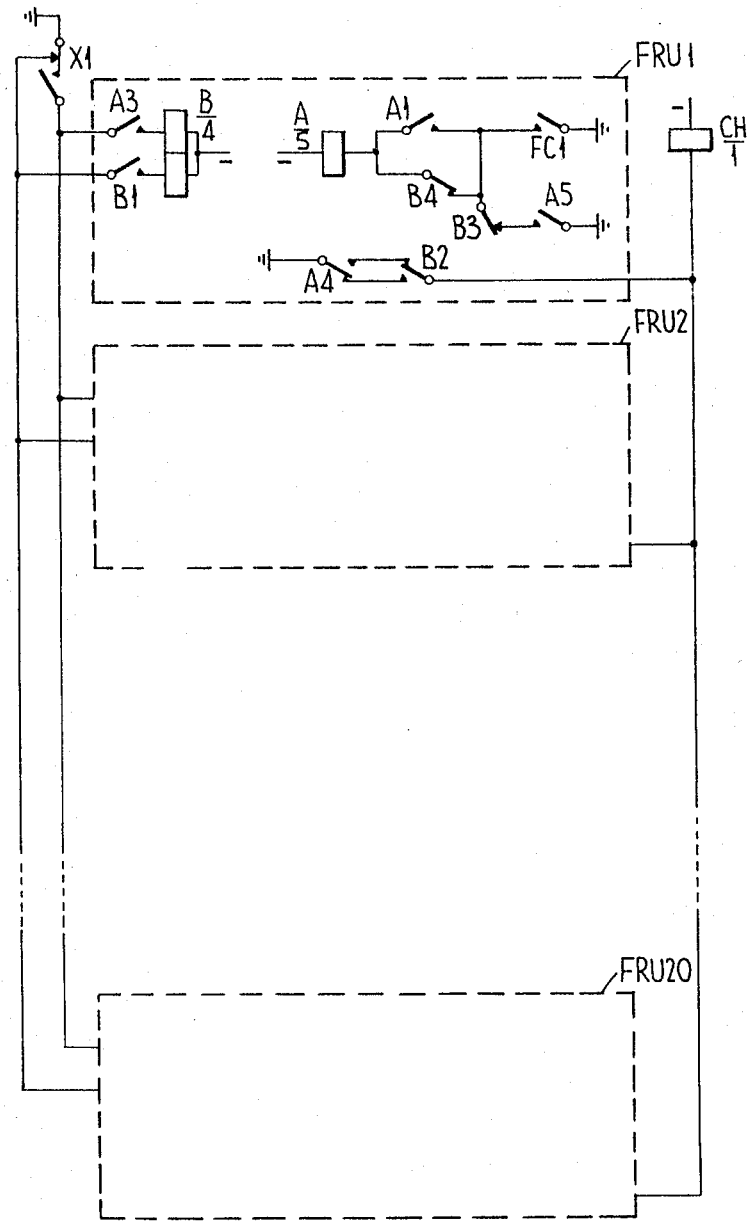

FIGURES 11, 11A, 12 and 13, when arranged as shown in FIGURE 14 show diagrammatically that part of the supervisory arrangement which is located at the repeater station 3 of FIGURE 1, and FIGURE 14 shows the relationship between FIGURES 11, 12 and 13, supplementary FIGURE 11A being considered part of its principal FIGURE 11

Although the supervisory arrangement now to be described forms part of a multi-station radio relay communication system, it is to be understood that the utility of the invention is not limited in this respect.

The signals passing over the communication system are combined in frequency multiplex and are modulated on to a carrier signal. A band of frequencies 3.1 kilocycles per second wide is allocated to the supervisory arrangement, other bands of frequencies within the available range of frequencies being allocated to the information signals which it is desired to transmit over the communication system. The band of frequencies allocated to the supervisory arrangement will normally be below the bands of frequencies allocated to the information signals.

As an alternative, the band of frequencies allocated to the supervisory arrangement may be carried on an auxiliary narrow-band radio relay system.

Referring to FIGURE 1, the communication system includes nineteen repeater stations 1 to 19, only three of which are shown, a terminal station 20 and a terminal station 21, the terminal station 21 also acting as the control station for the supervisory arrangement.

In practice the control station 21 would probably be adjacent to one of the stations 1 to 19, but for the purposes of this description stations 1 to 19 will be considered to be remote from the control station 21.

The links between the stations 1 to 21 of the communication system described are radio links, although they may be of some other form, for example, land lines. The links are such as to provide a "go" path 22 and a "return" path throughout the length of the communication system.

For the purposes of this description it is convenient to consider that each of the stations 1 to 21 is connected to a four-wire line which provides the "go" and "return" paths 22 and 23 respectively. Each of the stations 1 to 20 includes means to receive signals from the "go" path 22 and means to transmit signals to the "return" path 23, while the control station 21 includes means to transmit signals to the "go" path 22 and means to receive signals from the "return" path 23.

In addition to the receiving and transmitting means previously referred to, each of the stations 1 to 20 includes all the necessary ancillary equipment and stand-by equipment which is automatically brought into service in the event of a failure of the main equipment.

The supervisory arrangement is such as to permit up to twenty indications to be given at the control station 21 in respect of each of stations 1 to 20, and to permit up to twenty controls to be effected at each of stations 1 to 20 in response to signals sent from the control station 21.

The twenty indications which may be given at the control station in respect of station 3, for example, are associated respectively with twenty variables at the station 3. These variables may, for example, be an arrangement which indicates if the level of a pilot signal being transmitted over the communication system has passed outside some predetermined limits, an arrangement which indicates if the noise level is abnormally high, an arrangement which indicates that the pressure in a pressurised aerial feeder has dropped below some predetermined level, or an arrangement which indicates that there has been a switch from main to stand-by equipment. In respect of each of these variables, the indication which can be given is two-state, that is to say, normal or abnormal.

The twenty controls in station 3 which may be affected from the control station 21 may be associated with the variables in respect of which the indications are sent. Where a control is effected from the control station 21 the control is such as to effect a change from one condition to another condition, and not such as to permit a continuously variable control to be effected.

Referring to FIGURES 2, 2A, 3, 4, 4A, 4B, 5, 6, 7, 7A, 8 and 9 the supervisory apparatus at the control station 21 includes twenty-four oscillators 24/1 to 24/20 and 24/A to 24/D (of which only the oscillators 24/1, 24/2, 24/20, 24/A and 24/D are shown) which are connected by way of relay contacts TX1/1 to TX20/1 and TXA/1 to TXD/1 respectively to a combining amplifier 25, the output of which is connected to the "go" path 22.

The tones generated by the oscillators 24/1 to 24/20 and 24/A to 24/D are spaced at intervals of one hundred and twenty cycles per second throughout the band of frequencies allocated to the supervisory arrangement. These tones will hereinafter be referred to as tones $f1$ to $f20$ and $fA$ to $fD$ respectively.

The return path 23 is connected to the inputs of twenty band-pass filters 26/1 to 26/20 (of which only 26/1, 26/2 and 26/20 are shown) whose pass bands are centered on the frequencies of the tones $f1$ to $f20$ respectively. The outputs from these filters 26/1 to 26/20 are connected to the inputs of twenty tone receivers 27/1 to 27/20.

Figure 8:
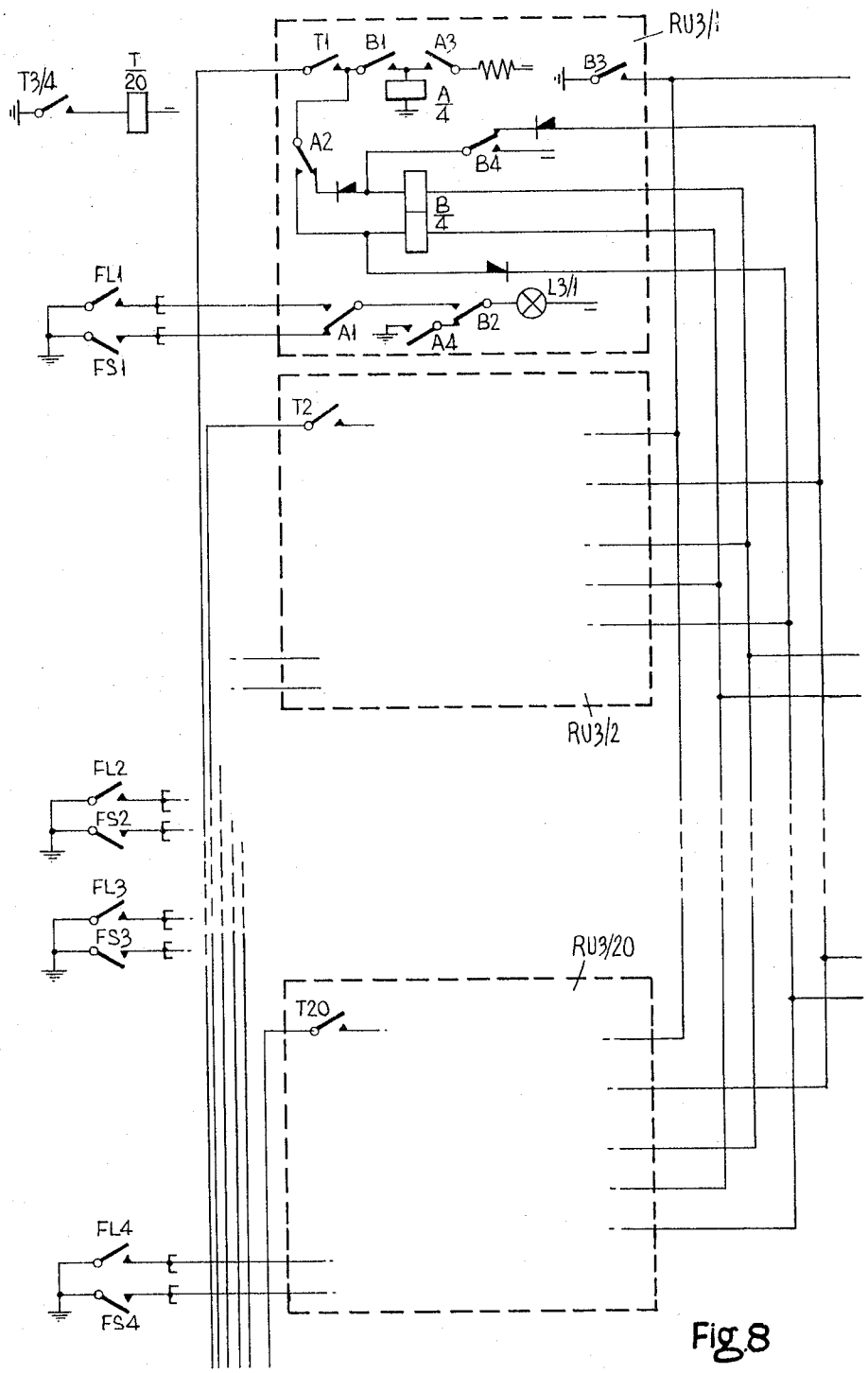

The control station also includes a total of four hundred register units RU, each of which has connected to it an indicator lamp L. Twenty of these register units with their respective indicator lamps are associated with the twenty variables respectively at each of the twenty remote stations 1 to 20. For clarity only three register units, RU3/1, RU3/2 and RU3/20, of the twenty associated with the remote station 3 are shown (FIGURE 8).

Referring to FIGURES 11, 11A, 12 and 13 the supervisory apparatus which is located at station 3 is typical of the apparatus located at the other remote stations 1 and 2 and 4 to 20. At the station 3 the "go" path 22 is connected to the inputs of twenty-four band-pass filters 28/1 to 28/20 and 28/A to 28/D which have their pass bands centred on the frequencies of the tones $f1$ to $f20$ and $fA$ to $fD$ respectively which may be transmitted on the "go" path by the control station 21. The outputs from these filters 28/1 to 28/20 and 28/A to 28/D are connected to twenty-four tone receivers 29/1 to 29/20 and 29/A to 29/D respectively.

Also at station 3 twenty oscillators 30/1 to 30/20, which generate tones $f1$ to $f20$ respectively, are connected by way of contacts $Tx1/1$ to $Tx20/1$ to the input of a combining amplifier 31 the output of which is connected to the return path 23.

The twenty variables at station 3 in respect of which indications may be transmitted to the control station 21 are each associated with one of twenty fault relay units FRU of which only three, FRU1, FRU2 and FRU20, are shown in the drawing (FIGURE 13).

When the variable associated with the fault relay unit FRU1 for example, is in its normal condition the contacts FC1 are open, the relays A and B are unoperated, and the operating circuit for the relay CH, by way of the contacts A4 and B2, is not complete. Similarly while the contacts FC2 to FC20, in the fault relay units FRU2 to FRU20 respectively, are open the relay CH remains unoperated. The contacts CH1 form a part of the operating circuit of a relay $Tx3$, whose contacts $Tx3/1$ connect the output of the oscillator 30/3 to the combining amplifier 31. Thus, so long as the relay CH remains unoperated the relay $Tx3$ will be operated and the tone $f3$, which serves as the identifying tone for station 3, will be transmitted on the "return" path 23.

If one of the variables at station 3 changes to its abnormal condition the operating circuit for the relay A in the corresponding fault relay unit FRU will be completed by way of corresponding contacts B4 and FC. The contacts A4 will complete the operating circuit of the relay CH, the contacts CH1 will open and the relay $Tx3$ will be released, so that the tone $f3$ is no longer transmitted on the "return" path.

In normal operation, therefore, when all the variables at the stations 1 to 20 are in their normal conditions the stations 1 to 20 transmit their respective identifying tones $f1$ to $f20$ on the "return" path, and the control station 21 receives the twenty tones $f1$ to $f20$. If variables at one or more of the stations 1 to 20 change to their abnormal conditions, however, the identifying tones of the stations at which the changes occur are no longer received at the control station.

Referring again to FIGURES 2, 2A, 3, 4, 4A, 4B, 5, 6, 7, 7A, 8, and 9, in normal operation the twenty tones $f1$ to $f20$ are received at the control station 21 on the "return" path 23 and are passed to the tone receivers 27/1 to 27/20 respectively by way of the band-pass filters 26/1 to 26/20 respectively.

While the twenty tones $f1$ to $f20$ are being received at the control station 21 relays RX1 to RX20 in the tone receivers 27/1 to 27/20 respectively remain operated, and the operating circuits for relays S1 to S20 (FIGURE 3), by way of contacts RX1/1 to RX20/1 respectively, are not made.

If a change occurs at station 3, for example, so that the station identifying tone $f3$ is no longer received at the control station 21, the relay RX3 of the tone receiver 27/3 will release, and the contacts RX3/1 of this relay complete the operating circuit of the relay S3. The contacts S3/1 of this relay S3 light a lamp SL3 which indicates that a change has occurred at station 3, the contacts S3/2 partly prepare an operating circuit for a relay ICH (FIGURE 5) and the contacts S3/3 complete a holding circuit for the relay S3 and operate a relay SSS. The contacts SSS1 of the relay SSS complete an operating circuit for a relay T1 (FIGURE 5), while the contacts SSS2 operate a relay SST.

A sequence commences upon the operation of the relay T1 during which the relays T1 and T21 (FIGURE 5) are operated in turn and those stations at which changes have occurred (in the present example station 3) are interrogated in turn to indicate at the control station 21 what changes have occurred.

When the relay T1 operates its contacts T1/1 prepare an operating circuit for the relay TX1 (FIGURE 7A), contacts T1/2 light the station lamp SL1, contacts T1/3 partly prepare an operating circuit for a relay COK (FIGURE 9), contacts T1/4 operate a relay T in the register units associated with station 1, contacts T1/5 operate a relay CYC (FIGURE 4B), contacts T1/6 prepare an operating circuit for the relay ICH, contacts T1/7 complete a holding circuit for the relay T1, contacts T1/8 break an operating circuit for the relay TTA (FIGURE 4A) and contacts T1/9 complete an operating circuit for relay T2.

The contacts CYC1 of the relay CYC break the original operating circuit of relay T1, contacts CYC2 prepare an operating circuit for a relay ACH (FIGURE 5), the contacts CYC3 complete an operating circuit for a relay IBP (FIGURE 5) and the contacts CYC4 prepare an operating circuit for the relay TTA.

The contacts SST1 of the relay SST partly prepare another operating circuit for the relay ACH, and the contacts SST2 prepare an operating circuit for a relay PRE, which circuit is completed if the function key FK (FIGURE 6) is in the normal (unoperated) position.

When the relay IBP operates its contacts IBP1 complete an operating circuit for the relay T2, the contacts IBP2 further break the operating circuit of the relay ICH, and the contacts IBP3 break an operating circuit and prepare a holding circuit for the relay TTB.

When the relay T2 operates its contacts T2/8 complete an operating circuit for the relay TTA, whose contacts TTA1 break the holding circuit for relay T1, which then releases, and complete a holding circuit for the relay T2. The contacts TTA2 prepare an operating circuit for the relay TTB, which is operated when the relay IBP is released by the operation of the contacts TTA3.

The contacts TTB1 of the relay TTB release the original operating circuit of the relay T2 and prepare an operating circuit for the relay T3, the contacts TTB2 prepare a holding circuit for the relay TTB and the contacts TTB3 change over, allowing the relay IBP to reoperate. Contacts IBP1 complete the operating circuit for the relay T3 and contacts IBP3 complete the holding circuit of the relay TTB.

When the relay T3 operates, its contacts T3/1 prepare an operating circuit for the relay TX3 (FIGURE 7A), contacts T3/2 complete a second operating path for the lamp SL3, contacts T3/3 partly prepare an operating circuit for the relay COK, contacts T3/4 operate a relay T in the register units associated with station 3 (FIGURE 8), contacts T3/5 hold the relay CYC operated, contacts T3/6 prepare an operating circuit for the relay ICH, contacts T3/7 prepare a holding circuit for the relay T3, contacts T3/8 break the operating circuit of relay TTA, which then releases, and contacts T3/9 prepare an operating circuit for the relay T4.

When the relay TTA releases, its contacts TTA1 break the operating circuit of the relay T2, which then releases, and complete a holding circuit for relay T3 by way of contacts T3/7, contacts TTA2 break the original operating circuit of relay TTB, and contacts TTA3 cause the relay IBP to release.

When the relay IBP releases, its contacts IBP1 break the original operating path of the relay T3, contacts IBP1 complete the operating circuit of the relay ICH, and contacts IBP3 release the relay TTB.

The contacts ICH1 of the relay ICH complete a holding circuit for relay ICH, contacts ICH2 break the normal operating circuit for the relay IBP, and the contacts ICH3 break a holding circuit for a relay 10 (FIGURE 6) and complete a holding circuit for the relay PRE.

At the commencement of the sequence of operations of the relays T1 to T2 described above the relay PRE operates upon the closing of contacts SST1 if the function key FK is in the normal (unoperated) position.

The contacts PRE1 of the relay PRE break the original operating circuit for the relay S3, the contacts PRE2 break the operating circuit of a relay OKS (FIGURE 6), contacts PRE3 operate the relay TXA, whereupon the tone fA is transmitted to the "go" path 22 by way of contacts TXA/1, and the combining amplifier contacts PRE4 complete a holding circuit for the relay PRE, contacts PRE5 partly prepare an operating circuit for the relay OKC (FIGURE 6), contacts PRE6 partly prepare an operating circuit for the relay OKR (FIGURE 6) and contacts PRE7 further break the operating circuit of a relay RL (FIGURE 5).

The relays OKS, IO, IP, IQ, IR, IS, IT, IU, IV, IW, and IX shown in FIGURE 6 are all slow-to-release relays, and of these relays all except IV and IX are normally operated, and their contacts are shown operated in the drawings.

The contacts PRE2 of the relay PRE break the operating circuit of the relay OKS as stated above, and after a delay relay OKS releases. The contacts OKS1 of the relay OKS break one operating circuit of the relay IO and the contacts OKS2 partly prepare a manual seizing circuit for the relays T1 to T20 (FIGURE 4).

When the contacts ICH3 change over, as described above, the second operating circuit for the relay IO is broken, and the relay IO starts to release. When the relay IO releases, its contacts IO1 operate the relay TX3 by way of contacts T3/1, and the tone f3 is transmitted by way of contacts TX3/1 and the combining amplifier 25 to the "go" path 22, contacts IO2 further break the holding circuit for the relay IO, contacts IO3 allow the relay IP to start releasing and the contacts IO4 break the manual seizing circuit for the relays T1 to T20.

When the relay IP releases, its contacts IP1 start the relay IQ releasing, and contacts IP2 break the operating circuit of the relay TX3, so that the tone f3 is no longer transmitted to the "go" path 22.

When the relay IQ releases, its contacts IQ1 further break a second operating circuit for the relay IBP, contacts IQ2 start the relay IR releasing, and the contacts IQ3 complete an operating circuit for the relay TXB, whereupon the tone fB is transmitted to the "go" path 22 by way of the contacts TXB/1 and the combining amplifier 25.

When the relay IR releases, its contacts IR1 prepare a holding circuit for the relay COK (FIGURE 9), contacts IR2 prepare an operating circuit for the relay COK, and the contacts IR3 start the relay IS releasing.

If, during the release time of the relay IS the tone f3 is received from the station 3 along the "return" path 23, the relay RX3 in the corresponding tone receiver 27/3 is operated, the contacts RX3/2 of the relay RX3 complete an operating circuit for the relay COK, and the contacts COK1 of this relay change over to complete a holding circuit for the relay by way of contacts IR1.

The contacts COK2 of the relay COK break a holding circuit for the relay IT and the contacts COK3 make a holding circuit for the relay IW.

When the relay IS releases, its contacts IS1 break the original operating circuit for the relay COK, contacts IS2 break the holding circuits for the relays S3 and SSS, contacts IS3 further break the normal operating circuit for the relay IBP and prepare the second operating circuit for that relay, contacts IS4 change over to break one holding circuit for the relay PRE and complete another holding circuit for that relay by way of contacts ICH3, contacts IS5 break the original operating circuit for the relay PRE, contacts IS6 start the relay IT releasing, contacts IS7 partly break a holding circuit for the relay IW, and the contacts IS8 break one operating circuit for the relay TXB, so that the tone fB is no longer transmitted to the "go" path 22.

When the relay IT releases, its contacts IT1 further break the holding circuit for relay IT, contacts IT2 complete an operating circuit for the relay OKR by way of contacts PRE6, IX1, IW3 and RL3, and contacts IT3 prepare an operating circuit for the relay OKC.

The relay OKR operates and its contacts OKR1 prepare an operating circuit for a routing relay R (FIGURE 9), contacts OKR2 complete a holding circuit for relay OKR, contacts OKR3 start the relay IU releasing, contacts OKR4 operate the relay IV, contacts OKR5 prepare a second operating circuit for the relay TXB, and contacts OKR6 operate the relay TXC (FIGURE 7) whereupon the tone fC is transmitted to the "go" path 22 by way of contacts TXC/1 and the combining amplifier 25.

Upon operation of the relay IV its contacts IV1 further break the operating circuit for the relay OKC, contacts IV2 operate the relay IX, and contacts IV3 complete a second operating circuit for the relay TXC.

When the relay IU releases, its contacts IU1 complete the operating circuit for the routing relay R, contacts IU2 start the relay IW releasing, and contacts IU3 complete the second operating circuit for the relay TXB, so that the tone fB is again transmitted to the "go" path 22.

Upon operation of the relay IX, its contacts IX1 break the original operating circuit of the relay OKR, contacts IX2 further break the operating circuit for the relay OKC, and contacts IX3 complete a second operating path for the relay TXA.

When the relay IW releases, its contacts IW1 further break the operating circuit of the relay TTB, contacts IW2 break the holding circuit of the relay ICH, which then releases, contacts IW3 break the holding circuit for the relay OKR, which then releases, and contacts IW4 break the holding circuit for relay IW.

Upon release of the relay OKR its contacts OKR1 release the routing relay R, contacts OKR2 further break the holding circuit for relay OKR, contacts OKR3 re-operate relay IU, contacts OKR4 start relay IV releasing, contacts OKR5 release the relay TXB, so that the tone fB is no longer transmitted to the "go" path 22, and contacts OKR6 break one operating circuit of the relay TXC.

When the relay IV releases, its contacts IV1 partly prepare the operating circuit for the relay OKC, contacts IV2 start the relay IX releasing, and contacts IV3 release the relay TXC, so that the tone fC is no longer transmitted to the "go" path 22.

When the relay IX releases, its contacts IX1 partly prepare the operating circuit for the relay OKR, contacts IX2 partly prepare the operating circuit for the relay DKC, and contacts IX3 release the relay TXA, so that the tone fA is no longer transmitted to the "go" path 22.

Upon re-operation of relay IU, contacts IU1 further break the operating circuit of the routing relay R, contacts IU2 prepare the operating circuit for the relay IW, and contacts IU3 further break one operating circuit for the relay TXB.

When the relay ICH releases following the release of the relay IW, contacts ICH3 break the remaining holding circuit for the relay PRE, which then releases. The relays OKS, IO, IP, IQ, IR, IS and IT now re-operate in turn, and the contacts IQ1 prepare the second operating circuit for the relay IBP, contacts IR1 break the holding circuit for the relay COK, contacts IS1 prepare an operating circuit for relay COK, contacts IS2 prepare the operating circuit for the relays S1 to S20 and the relay S, contacts IS3 prepare the normal operating circuit for the relay IBP, contacts IS5 and IS4 respectively re-operate and hold the relay PRE, and the contacts IS5 re-operate the relay IW.

The contacts IW1 prepare the operating circuit for the relay TTB and the contacts IW2 complete the operating circuit for the relay IBP. The contacts IBP1 complete the operating circuit for the relay T4 by way of contacts T3/9, and the sequential operation of the relays T4 to T21, which was suspended upon the operation of the relay ICH, now continues.

Referring now to FIGURES 11, 11A, 12 and 13, when the relay PRE at the control station 21 operates the tone fA is transmitted on the "go" path 22 to all of stations 1 to 20. At station 3 receipt of the tone f(A) at the tone receiver 29/A operates the relay RxA, and its contacts RxA/1 break one holding circuit for a relay SL, which is normally operated, and partly prepare an operating circuit for the relays SS, SA and SB, while the contacts RxA/2 further break the operating circuit of the relay Tx3 and prepare a holding circuit for the relays SS, SA and SB.

At the stations 1 and 2, and 4 to 20, operation of their respective relays RxA break the transmitting circuits associated with the respective station identifying tone oscillators, so that none of the identifying tones of stations 1 to 20 are now transmitted to the control station 21. The supervisory pahs 22 and 23 are now available for the interrogation of station 3 by the control station 21.

At the control station 21 the release of the relay IO results in the transmission of the tone f3 to the "go" path 22. When this tone is received at station 3 the relay Rx3 operates, and its contacts Rx3/1 partly prepare an operating circuit for a control relay CR2, while contacts Rx3/2 complete the operating circuit the relays SS, SA and SB.

The contacts SS1 of the relay SS complete the holding circuit for the relays SS, SA and SB, and these relays remain operated as long as the control station 21 is transmitting to tone fA. The contacts SS2 partly prepare an operating circuit for the relay X, and the contacts SS3 prepare a second operating circuit for the relay Tx3.

The contacts SA1 to SA20 partly prepare operating circuits for the control relays CR1 to CR10, while the contacts SB1 to SB20 prepare operating circuits for the relays Tx1 to Tx20.

The tone f3 is cut off upon the release of the relay IP at the control station 21, and after a short delay the tone fB is transmitted from the control station 21 upon the release of the relay IQ at the control station 21.

Upon receipt of the tone fB at station 3 the relay RxB is operated, and its contacts RxB/1 break the second holding circuit for the relay SL, which then releases, while the contacts RxB/2 complete the second operating circuit for the relay Tx3, whereupon the tone f3, the identifying tone for station 3, is transmitted on the "return" path 23 by way of contacts Tx3/1 and the combining amplifier 31.

After a short delay the tone fB is cut off by release of the relay IS at the control station 21, and the relay RxB at station 3 releases, so that station 3 no longer transmits the tone f3 to the "return" path 23.

Assuming, as before, that the variable associated with fault relay unit FRU1 in station 3 is the variable which has changed to its abnormal condition, the contact FC1 (FIGURE 13) is closed and the relay A in FRU1 operates, and its contacts A1 complete a holding circuit for relay A, its contacts A2 further break the operating circuit for the relay Tx1 (FIGURE 12), contacts A3 prepare an operating circuit for the relay B, and its contacts A4 operate the relay CH.

The contacts A2 of the relays A in the fault relay units FRU1 to FRU20 are shown in FIGURE 12 as contacts A2/1 to A2/20 respectively.

The tone fC is now transmitted on the "go" path 22 upon the operation of the relay OKR at the control station 21. The relay RxC at station 3 operates, and its contacts RxC/1 break one operating circuit for the relay Tx3 and prepare the operating circuit for the relay X, while its contacts RxC/2 complete operating circuits for the relays Tx2 to Tx20 by way of the unoperated contacts A2/2 to A2/20 respectively, and the tones f2 to f20 are transmitted on the "return" path 23.

After a short delay the tone fB is again transmitted on the "go" path 22 upon the release of the relay IU at the control station 21. Receipt of tone fB re-operates the relay RxB at station 3, and the contacts RxB/2 complete the operating circuit for the relay X, which then operates.

The contacts X1 of the relay X break a holding circuit for the relay B in the fault relay unit FRU1 and complete an operating circuit for this relay B, which then operates.

The contacts B1 of the relay B in FRU1 prepare a holding circuit for relay B, contacts B2 break the operating circuit for the relay CH, which then releases, contacts B3 and B4 break two holding circuits for the relay A, which remains operated by way of the contacts FC1 and A1.

The tone fB from the control station 21 is now cut off upon the release of the relay OKR at the control station 21, the relay RxB at station 3 releases and its contacts RxB/2 release therelay X, whose contacts X1 complete the holding circuit for the relay B and break the original operating circuit for relay B.

The tone fC from the control station 21 is now cut off upon release of the relay IV at the control station 21, the relay RxC at station 3 release, and its contacts RxC/1 further break the operating circuit for the relay X and partly prepare an operating circuit for the relay Tx3, while contacts RxC/2 release the relays Rx2 to Tx20 and further break the operating circuit for relay Tx2.

The relay IX at the control station 21 now releases, so that the tone fA is no longer transmitted on the "go" path 22. At station 3 the relay RxA releases, and its contacts RxA/1 change over, further breaking the operating circuit for the relays SS, SA and SB and completing the operating circuit for the relay SL, while contacts RxA/2 break the holding circuit for the relays SS, SA and SB, when then release, and complete an operating circuit for the relay Tx3 by way of contacts CH1. The tone f3 is thereupon transmitted on the "return" path 23. The stations 1 and 2, and 4 to 20 also resume transmission of their respective identifying tones, so that the control station 21 again receives all of the tones f1 to f20.

If the variable associated with the fault relay unit FRU1 at station 3 subsequently returns to its normal condition, the contacts FC1 open and the relay A releases, so that the relay CH is operated by way of the contacts A4 and B2. The contacts CH1 again release the relay Tx3, cutting off transmission of the tone f3, so that the interrogation sequence again takes place.

Referring again to FIGURES 2, 2A, 3, 4, 4A, 4B, 5, 6, 7, 7A, 8 and 9, upon the release of the relay IU, its contacts IU1 complete the operating circuit for the routing relay R (FIGURE 9). The contacts R1 of this relay break the connection between the contacts RX1/1 and one operating winding of the relay S1 (FIGURE 3) and instead prepare a path from the contacts RX1/1 to twenty register units RU, these twenty register units RU being associated respectively with first variables at the twenty stations 1 to 20. The contacts R2 to R20 each operate in a similar manner to prepare pahs from each of the contacts RX2/1 to RX20/1 to twenty register units RU.

As the relays T1 to T20 (FIGURE 4) operate in turn their respective contacts T1/4 to T20/4 in turn complete the paths from the contacts RX1/1 to RX20/1 to the twenty register units RU associated with one of the remote stations 1 to 20. As shown in FIGURE 8, for example, when relay T3 operates, its contacts T3/4 operate a relay T, and the contacts T/1 to T/20 of this relay complete the paths between the contacts RX1/1 to RX20/1 and the register units RU3/1 to RU3/20 respectively, which are associated with station 3. For clarity only the register units RU3/1, RU3/2 and RU3/20 are shown in FIGURE 8.

The relay IU at the control station 21 releases while the control station 21 is transmitting the tone fC. In the example given above, station 3 transmits the tones f2 to f20 on the "return" path 23 in response to the tone fC from the control station 21, so that, of the relays RX1 to RX20, only relay RX1 remains unoperated. Thus, when the paths between the contacts RX1/1 to RX20/1 and the register units RU3/1 to RU3/20 are completed, an operating potential is applied to one winding of the relay B in the register unit RU3/1 and to the winding of a relay ALF (FIGURE 9), while the relays B in the register units RU3/2 to RU3/20 remain unoperated.

In the register unit RU3/1, when the relay B operates is contacts B1 complete an operating circuit for the relay A, which then operates, contacts B2 prepare an operating path for a lamp L3/1 which is associated with the first variable at station 3, contacts B3 complete an operating circuit for a flasher unit 32 (FIGURE 9), and contacts B4 complete a holding circuit for relay B. While the flasher unit 32 is operating two relays FGA and FGB operate in turn, the relay FGB being operated for a period five times as long as the period of operation of the relay FGA. The contacts of the relays FGA and FGB operate twenty relays FS and twenty relays FL respectively, one relay FS and one relay FL being associated with the twenty register units associated with each remote station.

Figure 9:
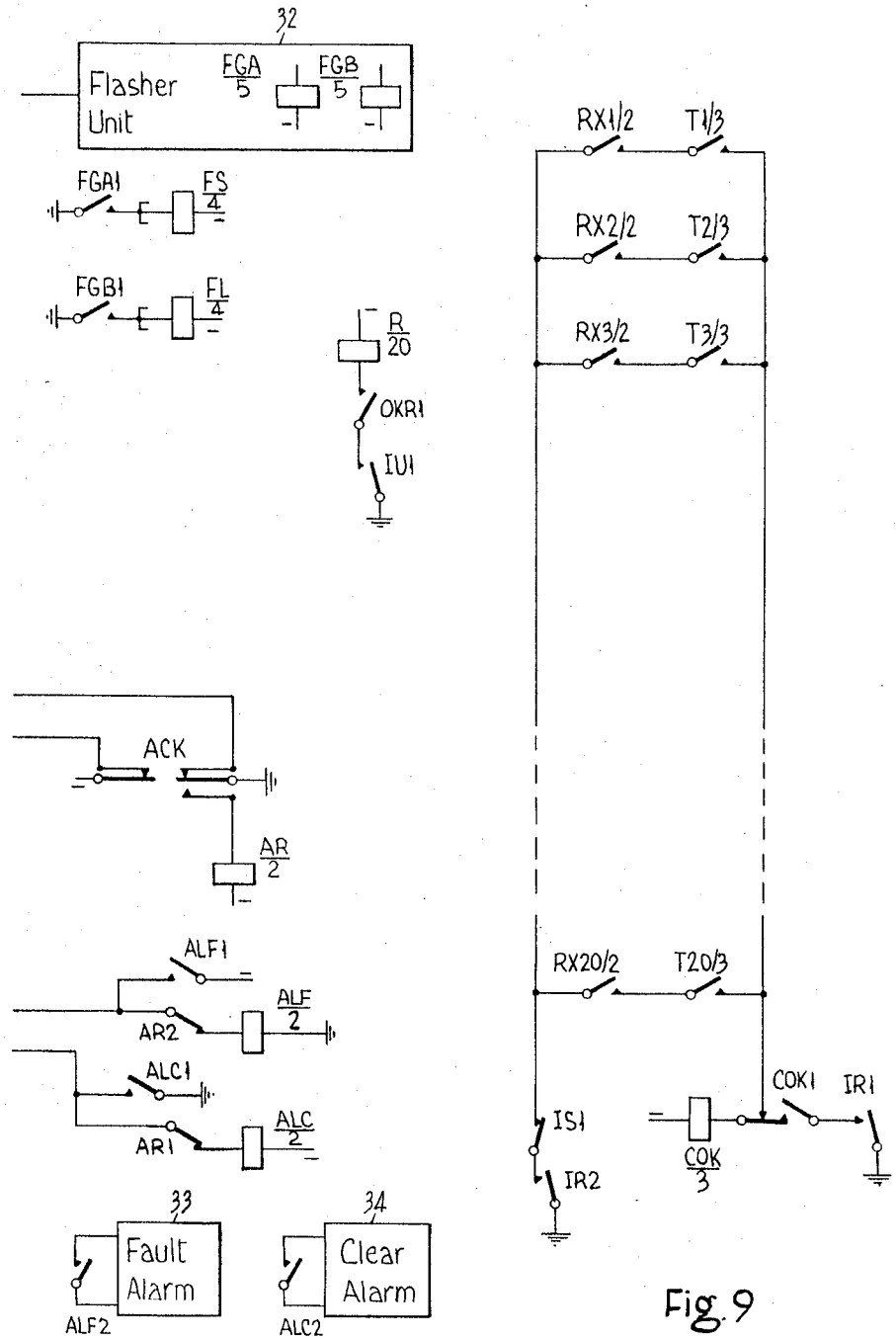

When the relay A in register unit RU3/1 operates, its contacts A1 connect the lamp L3/1 to a contact FL1 and, since the flasher unit 32 is operating, the lamp L3/1 flashes with an on:off ratio of five to one. The contacts A2 break the original operating circuit for the relay B and the relay ALF, and partly prepare operating circuit for a relay ALC (FIGURE 9). The contacts A3 complete a holding circuit for relay A. Contacts A4 have no function at this stage.

The contacts ALF2 of the relay ALF operate a fault warning alarm 33 (FIGURE 9), while contacts ALF1 hold relay ALF by way of contacts AR2 of a relay AR (FIGURE 9).

The lamp L3/1 will continue its flashing and the fault alarm 33 will remain operated until the new indication is acknowledged by operation of the acknowledge key ACK (FIGURE 9). Operation and release of the key ACK breaks both of the possible operating or holding paths for the relay B in register unit RU3/1 and also operates and releases a relay AR (FIGURE 9). The contacts AR2 of the relay AR break the holding circuit for the relay ALF, so that the fault alarm 33 is no longer operated.

The relay B in unit RU3/1 releases, so that the flasher unit 32 stops operating, and contacts B2 complete a second operating circuit for the lamp L3/1 by way of contacts A4, so that the lamp L3/1 remains on.

If the first variable at station 3 subsequently returns to its normal condition, the interrogation sequence again takes place. When the paths between the contacts RX1/1 to RX20/1 and RU3/1 to RU3/20 are completed in this case, however, earth potential will be applied to one end of the second winding of the relay B in the unit RU3/1, by way of the contacts T1 and the contacts A2. Since the other end of second winding of relay B is connected by way of the acknowledge key ACK to a point of negative potential, relay B again operates. The application of earth potential by way of the contacts T1 and A2 also operates a relay ALC (FIGURE 9), whose contacts ALC2 operate a clear alarm 34, while contacts ALC1 hold relay ALC by way of contacts AR1.

When the relay B operates its contacts B1 remove the operating potential for the operating winding of the relay A, which then releases, contacts B2 prepare a path for the operation of the lamp L3/1, contacts B3 operate the flasher unit 32, and contacts B4 complete a holding circuit for relay B.

When the relay A releases, its contacts A1 connect the lamp L3/1 to the contact FS1, and since the flasher unit is now operating the lamp L3/1 flashes with an on:off ratio of one to five. The contacts A2 break the operating circuit of relay B, and contacts A3 break the holding circuit of relay A.

The lamp L3/1 continues flashing and the clear alarm 34 remains operated until the acknowledge key ACK is operated and released, releasing the relay B and operating and releasing the relay AR. When the relay AR operates, its contacts AR1 break the holding circuit for the relay ALC, so that the clear alarm 34 is no longer operated.

When the relay B releases the lamp L3/1 is extinguished and the flasher unit 32 stops operating.

The indications which may be given at the control station 21 may thus be summarised as follows:

While a variable at a remote station remains in its normal condition the lamp associated with that variable at the control station 21 remains extinguished.

When a variable changes from the normal to the abnormal condition, upon interrogation of the remote station concerned the lamp associated with that variable flashes with an on:off ratio of five to one, the long flashes indicating the occurrence of a new fault.

When the new fault indication is acknowledged at the control station 21 by operation of the key ACK, the lamp associated with the variable is lighted continuously.

When a variable changes from its abnormal to its normal condition, upon interrogation of the remote station concerned the lamp associated with that variable flashes with an on:off ratio of one to five, the short flashes indicating a new clearance of a fault. When the new clearance is acknowledged by operation of the key ACK the lamp associated with the variable is extinguished.

At the control station 21, when the sequential operation of the relays T1 and T21 reaches the stage when the relay T21 is operated an automatic check is initiated to determine whether any variables at any of the remote stations have changed condition during the interrogation sequence.

The relay T21 is operated by way of contacts T20/9 and contacts TTB1 when the relay IPB operates. The contacts T21/3 of relay T21 release the relay TTA, so that the contacts T21/2 hold relay T21 by way of contacts TTA1. When the relay TTA releases contacts TTA3 cause the release of the relay IBP, which in turn releases the relay TTB by way of its contacts IBP3.

The relay IBP now re-operates, and the relay FIN is operated by way of contacts T21/4, contacts TTB1 and contacts IBP1. The contacts FIN3 operate the relay TTA, and the relay FIN is held by way of its contacts FIN5, contacts ACH2 of a relay ACH (FIGURE 5) and the contacts TTA1. The relay IBP is released by operation of the contacts TTA3, and the relay TTB is operated by way of contacts TTA2 and IBP3. When the relay TTA operates, its contacts TTA1 release relay T21.

The contacts FIN1 of the relay FIN hold the relay CYC while the automatic check is initiated, contacts FIN2 prepare an operating circuit for the relay T1, and contacts FIN4 prepare an operating circuit for the relay ACH, which is slow to operate.

Upon the operation of the relay TTB, the relay IBP re-operates, the relay T1 operates and the relay ACH begins to operate. The sequential operation of the relays T1 to T21 now recommences.

The relay ACH operates and is held by way of its contacts ACH3 and the contacts CYC2, and the relay FIN releases. The contacts ACH4 complete an operating circuit for the relay ICH, so that as the sequence of operations of relays T1 to T21 proceeds each of the remote stations 1 to 20 is interrogated in turn.

When the automatic check is completed the open contacts ACH1 prevent a repetition of the sequence and contacts ACH2 prevent the holding of relay FIN. The relays CYC, TTA and TTB release, the relay ACH releases following the release of relay CYC and the apparatus returns to the original condition, in readiness for any new change of condition of variables at the remote stations 1 to 20.

If an operator at the control station 21 wishes to initiate the interrogation of one of the remote stations 1 to 20 or wishes to effect a control at one of the remote stations this may be achieved by operation of the appropriate one of twenty seize keys SZ1 to SZ20. Again taking station 3 as an example, upon operation of the appropriate seize key SZ3 at the control station 21 the contacts SZ3/1 (FIGURE 5) operate a relay MAN (FIGURE 5), while the contacts SZ3/2 partly prepare an operating circuit for the relay T3.

The contacts MAN2 of the relay MAN prepare an operating circuit for relay MAO, which is slow to operate, while the contacts MAN1 operate a relay RL by way of contacts PRE7 and MAO2 (FIGURE 5).

Contacts RL1 of the relay RL break the earth connection (FIGURE 4) which is used in the sequential operation of the relays T1 to T21. Contacts RL2 start the relay MAO operating, and contacts FL3 further break the normal operating path for the relay OKR (FIGURE 6).

When the relay MAO operates, its contacts MAO1 replace the earth connection broken by contacts RL1 (FIGURE 4), contacts MAO2 change over, breaking the original operating circuit of the relay RL and completing a holding circuit for relay RL, contacts MAO3 further break a holding circuit for the relay ICH and complete an operating path for relay ICH, contacts MAO4 complete an operating path for the relay PRE, contacts MAO5 complete a holding circuit for the relay IW (FIGURE 6), and the contacts MAO6 prepare an operating circuit for the relay T3.

The operation of the relay PRE starts the relay OKS releasing as described above, and upon the release of relay OKS its contacts OKS2 operate the relay T3 which is then held by way of contacts T3/7 and TTA1. The sequential release of the relays IO, IP, IQ, IR, IS and IT now takes place as in the case of the automatic interrogation described above. The relay OKR does not automatically operate upon the release of relay IT, however, since the contacts RL3 are open.

The supervisory system is now set up under manual control for the completion of interrogation of remote station 3 or for one or more controls to be effected at station 3. The tone $fA$ is being transmitted to station 3, the relay SL at station 3 is released and the relays SS, SA and SB are operated and held. The register units RU3/1 to RU3/20 (FIGURE 8) at control station 21 are connected to the relay contacts RX1/1 to RX20/1, respectively, ready for registration of indications from station 3 as before.

If a control is to be effected at station 3 a function key FK is operated so that its contacts FK1/1 further break a holding circuit for the relay PRE and its contacts FK1/2 complete the operating circuit for the relay OKC.

The contacts OKC1 of the relay OKC prepare operating circuits for the relays TX1 to TX20, contacts OKC2 complete a holding circuit for relay OKC, contacts OKC3 operate relay IX, and contacts OKC4 operate the relay TXD (FIGURE 7), so that a tone $fD$ is transmitted by way of contacts TXD1 and the combining amplifier 25 to the "go" path 22. Contacts IX1 of the relay IX further break the operating circuit of relay OKR, contacts IX2 break the original operating circuit of the relay OKC, and contacts IX3 complete a holding circuit for the relay TXA.

A control may now be effected at station 3 by pressing one of the twenty control keys CON. If key CON1 is pressed, for example, the relay TX1 operates, so that the tone $f1$ is transmitted on the "go" path, thus effecting the required control, as will be described.

The function key may now be returned to the unoperated position, whereupon the relay OKC releases, so that the tone $fD$ is no longer transmitted, and, after a short delay, relay IX releases.

Referring again to FIGURES 11, 11A, 12 and 13, when the tone $fD$ is received at station 3, the relay RxD in the tone receiver 29/D (FIGURE 11A) operates, and its contacts RxD/1 break the original operating circuit for the relays SS, SA and SB, and prepare operating paths for the control relays CR1 to CR10.

When the tone $f1$ is received at station 3, the contacts Rx1/1 of the relay Rx1 close, and one winding of the control relay CR1 is energised to effect the desired control.

The control relays CR1 to CR10 shown in FIGURE 12 are switched one way by a first tone and may be switched back again by a second tone, although it will be appreciated that the twenty tones may be employed individually to effect twenty unidirectional controls.

Since the control relays CR may be associated with the variables in respect of which indications are given at the control station 21, station 3 may now be interrogated manually by a further operation of the function key FK at the control station 21. The key FK is therefore operated so that its contacts FK2/1 further break a holding circuit for the relay PRE and its contacts FK2/2 operate the relay OKR.

As in the case of automatic interrogation, upon operation of the relay OKR, the tone $fC$ is transmitted on the "go" path 22, the relay IU starts releasing and the relay IV is operated. When relay IU releases the tone $fB$ is also transmitted on the "go" path 22, and operation of the routing relay R (FIGURE 9) completes the connections to the register units RU3/1 to RU3/20. The relay IW does not start releasing when contacts IU2 open since relay IW is held by the contacts MAO5.

When the manual registration of the indications from station 3 is complete the function key may be restored to the unoperated position, so that relay OKR releases and the tone $fB$ is no longer transmitted, and after a short delay relay IV releases, so that the tone $fC$ is no longer transmitted.

After a further short delay the relay IX releases, although its contacts have no function at this stage.

The supervisory system is now ready for any further control or interrogation of station 3. If no further action is required the seize key SZ3 at the control station 21 is released, so that its contacts SZ3/1 release the relay MAN and thereby release the relays MAO and RL, and contacts SZ3/2 further break the seizing circuit for the relay T3.

The system now returns to its original condition in readiness for any change of condition of the variables at the remote stations.

The indications which are transmitted from the remote stations 1 to 20 to the control station 21 may be displayed at the respective remote stations, and the necessary register units and lamps (corresponding to the register units RU and lamps L) may be provided at each remote station for this purpose. These registers may, for example, be switched into circuit to facilitate maintenance or repairs at a remote station.

If the oscillator which provides the station identifying tone for a remote station fails, the interrogation sequence will be interrupted by the failure of the remote station to respond in the normal manner, and provision may be made firstly to indicate this condition to the operator at the control station 21 and secondly to bypass part of the interrogation sequence in order to effect, for example, the switching in of a standby oscillator in place of the oscillator which has failed.

If it is desired to have a second control station at which indications may be displayed and from which controls may be effected, the signals from the remote stations 1 to 20 may be transmitted on both the "go" path 22 and the "return" path 23, and the tone receivers at the remote stations 1 to 20 may be arranged to receive signals from both the "go" path 22 and the return" path 23. The second control station may be arranged so that on receipt of the tone $fA$ for example, from the control station 21 it is prevented from initiating an interrogation sequence or from effecting controls.

In a modification of the system described above the tone oscillators at the remote station are omitted, and during normal operation of the modified system the twenty tones $f1$ to $f20$ are transmitted by the control station 21 on the "go" path 22, each of stations 1 to 20 receiving all twenty tones but only re-transmitting its own identifying tone on the "return" path 23. During an interrogation sequence with the modified system the control station 21 again transmits all twenty tones, while the remote station being interrogated re-transmits on the "return" path 23 only those of the tones f1 to f20 which correspond to the variables at that remote station which are in the normal condition.

I claim:
1. A supervisory arrangement including
    (A) apparatus at a control station of a communication system and
    (B) apparatus at a plurality of other stations of said communication system,
    (C) the aparatus at each of the other stations comprising
        (I) a plurality of devices each having one or the other of two states in dependence upon the operative condition of units of equipment individually coupled thereto,
        (II) first means to transmit a plurality of tone signals of different frequencies,
            (a) each different signal being characteristic of a respective different one of the devices at one of said other stations,
            (b) signals having these frequencies being transmitted by all said other stations to characterize corresponding devices at those stations,
        (III) second means to select one of said plurality of signals for transmission as a station identifying signal,
            (a) signals of different frequency identifying each of said other stations,
        (IV) third means which is responsive to reception of a first command signal transmitted by the control station to inhibit transmission of the identifying signal,
        (V) fourth means which is responsive to reception of a signal transmitted by the control station of the frequency of the identifying signal for that other station,
        (VI) fifth means which is responsive to operation of the fourth means and to reception of a second command signal transmitted by said control station to effect transmission of all the signals characteristic of those devices at that other station that are in a predetermined state, and
    (D) the apparatus at the control station comprising
        (I) first means to receive the identifying signals transmitted by said other stations,
        (II) second means to recognize if any of these identfying signals are not being received,
        (III) third means which is responsive to operation of said second means to transmit the first and second command signals and any of the tone signals for the purpose of operating the third, fourth or fifth means at any of said other stations, and
        (IV) fourth means to provide an indication of the state of any of the devices at the other stations in response to signals transmitted upon operation of the fifth means at said other stations.

2. A supervisory arrangement in accordance with claim 1 wherein said control station is provided with means to generate said first and second control signals and said plurality of tone signals, and each of said stations is each provided with means to generate said plurality of tone signals.

3. A supervisory arrangement in accordance with claim 1 wherein said control station is provided with means to generate said first and second control signals and said plurality of tones and each of said other stations is provided with a plurality of filter means to pass to the first means at that other station, for transmission thereby, tone signals received from said control station.

4. A supervisory arrangement in accordance with claim 1 wherein the control station is provided with means to transmit a third control signal and each of the other stations is provided with means responsive to reception of said third control signal and any of said tone signals to effect controls in individual ones of the units of apparatus at that other station.

5. In a supervisory arrangement including apparatus at a control station of a communication system and apparatus at a plurality of other stations of said communication system, apparatus for one of said other stations comprising
    (A) a plurality of devices each having one or the other of two states in dependence upon the operative condition of units of equipment individually coupled thereto,
    (B) first means to transmit a plurality of tone signals of different frequencies,
        (I) each different signal being characteristic of a respective different one of the devices at that other station,
    (C) second means to select one of said plurality of signals for transmission as a station identifying signal,
    (D) third means which is responsive to reception of a first command signal transmitted by the control station to inhibit transmission of the identifying signal,
    (E) fourth means which is responsive to reception of a signal transmitted by the control station of the frequency of the identifying signal for that other station, and
    (F) fifth means which is responsive to operation of the fourth means and to reception of a second command signal transmitted by said control station to effect transmission of all the signals characteristic of those devices at that other station that are in a predetermined state.

6. In a supervisory arrangement including apparatus at a control station of a communication system and apparatus at a plurality of other stations of said communication system, at each of which other stations are situated a plurality of devices each having one or other of two states in dependence upon the operative condition of units of equipment individually coupled thereto, apparatus at the control station comprising
    (A) first means to receive a plurality of tone signals of different frequencies transmitted by said other stations,
    (B) second means selectively to transmit first and second command signals and said plurality of tone signals,
    (C) third means normally to register indications of the general operative condition of said other stations in dependence upon tone signals received from said other stations by said first means, and
    (D) fourth means to register indications of the respective states of the devices at said other stations in dependence upon tone signals received by said first means during periods when said first command signal is being transmitted by said control station.

7. In a communication system which comprises a plurality of spaced stations which are linked by a two-way transmission path, and one of which constitutes a control station, a supervisory arrangement comprising,
    (A) at each of said stations,
        (I) a plurality of devices each having one or the other of two states in dependence upon the operative condition of units of equipment individually coupled thereto,
        (II) means to transmit over the two-way path a plurality of tone signals of different frequencies in a series of spaced frequencies allotted to the supervisory arrangement,
            (a) each different signal being characteristic of a respective different one of the devices at the station, (III) means to select one of said plurality of signals for transmission over the two-way path as a station identifying signal,
    (a) signals of different frequency identifying different ones of said stations,
(IV) inhibit means which is responsive to reception of a first command signal from the control station over said two-way path to inhibit transmission of the identifying signal,
(V) station selecting means which is responsive to reception of a first command signal from the control station over the two-way path of a signal of the frequency of the identifying signal for the station,
(VI) relay means which is responsive to operation of the station selecting means and to reception of a second command signal from the control station over the two-way path to effect transmission over said two-way path of all the signals characteristic of those devices at the station that are in a predetermined state, and (B) at said control station, control apparatus linked to said two-way path comprising (I) means to receive from the two-way path the identifying signals from all the stations,
(II) means to recognize if any of these identifying signals are not being received,
(III) means which is responsive to operation of said last mentioned means to transmit the first and second command signals and any of the tone signals for the purpose of operating the inhibit,
(IV) station selecting and relay means at any of the stations, and
(V) means to provide an indication of the state of any of the devices at any of the stations in response to signals transmitted upon operation of the relay means at those stations.

References Cited by the Examiner

UNITED STATES PATENTS 2,840,797   6/1958   Derr _____ 325—53 X
3,222,646  12/1965  Hammer _____ 340—182 X DAVID G. REDINBAUGH, *Primary Examiner.*

B. V. SAFOUREK, *Assistant Examiner.*